United States Patent [19]

Tobita et al.

[11] Patent Number: 4,789,768
[45] Date of Patent: Dec. 6, 1988

[54] PROJECTION WELDER

[75] Inventors: Hideaki Tobita, Toyota; Kazuo Naruse, Okazaki; Shigeru Yajima, Nagoya, all of Japan

[73] Assignees: Toyota Jidosha Kabushiki Kaisha, Aichi, Japan; Yajima Kogyo, Inc., Aichi, Japan

[21] Appl. No.: 939,730

[22] Filed: Dec. 9, 1986

[51] Int. Cl.⁴ .............................................. B23K 11/14
[52] U.S. Cl. .................................. 219/78.01; 219/93; 219/95
[58] Field of Search ................... 219/78.01, 117.1, 93, 219/95, 98, 99

[56] References Cited

U.S. PATENT DOCUMENTS

| | | | |
|---|---|---|---|
| 2,623,974 | 12/1952 | Prucha | 219/98 |
| 3,293,402 | 12/1966 | Graham | 219/98 |
| 4,020,316 | 4/1977 | Schaft et al. | 219/93 |
| 4,609,805 | 9/1986 | Tobita et al. | 219/93 |

FOREIGN PATENT DOCUMENTS

| | | | |
|---|---|---|---|
| 6580/81 | 6/1979 | Japan . | |
| 82176 | 5/1984 | Japan | 219/117.1 |
| 118387 | 6/1985 | Japan | 219/98 |

Primary Examiner—Clifford C. Shaw
Attorney, Agent, or Firm—Finnegan, Henderson, Farabow, Garrett & Dunner

[57] ABSTRACT

A projection welder including a guide pin adapted to be withdrawn, when welding is performed, into an electrode for performing welding. The guide pin is formed with a tapering surface portion which is positioned, when the guide pin is inserted in a threaded opening formed in a nut to be welded which adheres to a forward end of the electrode, against the edge of an entrance to the threaded opening.

9 Claims, 6 Drawing Sheets

PROJECTION WELDER

BACKGROUND OF THE INVENTION (1) Field of the Invention

This invention relates to projection welders, and more particularly it is concerned with a projection welder suitable for use in welding nuts to a panel formed with no openings in preparation for welding the nuts to the panel.

(2) Description of the Prior Art

One type of projection welder for welding nuts on to a panel known in the art is disclosed in Japanese Utility Model Unexamined Publication No. 6580/81. This projection welder comprises maganetically attracting means located on an upper electrode for attracting a nut to the upper electrode which is moved downwardly, together with a nut, to a predetermined position on a panel located in a lower electrode, to thereby effect positioning of the nut and welding of the nut to the panel at the same time.

This projection welder of the prior art has suffered the disadvantage that variations tend to occur in the location at which the nut adheres to the upper electrode by magnetic attraction, thereby making it impossible to achieve correct positioning of the nut with the panel on the lower electrode. Thus the problem encountered is how to improve the accuracy with which the nut is positioned when it is welded to the panel. This problem could be obviated by providing the electrode to which the nut is attracted with guide means for positioning the nut. However, the provision of the guide means would create another problem. That is, when welding is performed, a shunting current might flow through the guide means when a welding current is applied, causing a lowering in the quality of the weld to occur.

SUMMARY OF THE INVENTION

This invention has as its object the provision of a projection welder capable of producing welds of high quality while being able to position each nut in the correct welding position without any trouble.

The outstanding characteristic of the invention enabling the aforesaid object to be accomplished is that a guide pin is mounted in an electrode for performing welding and adapted to move into and out of a threaded opening formed in a nut to be welded which adheres to a forward end of the electrode, the guide pin being formed with a tapering surface portion adapted to be positioned against the edge of an entrance to the threaded opening, and control means controls the movement of the guide pin so that it is withdrawn into the upper electrode when welding is performed.

In the projection welder provided with the aforesaid feature according to the invention, the nut can be correctly positioned with the electrode to which it is magnetically attracted by means of the guide pin even if no opening to be disposed below the nut is not formed in the panel, and the guide pin is withdrawn to a retracted position when welding is performed to avoid shunting of the welding current. This is conducive to increased precision in performing welding and improved quality of the welds.

DESCRIPTION OF THE PREFERRED EMBODIMENT

A preferred embodiment of the projection welder in conformity with the invention will now be described by referring to the accompanying drawings.

Figure 1:
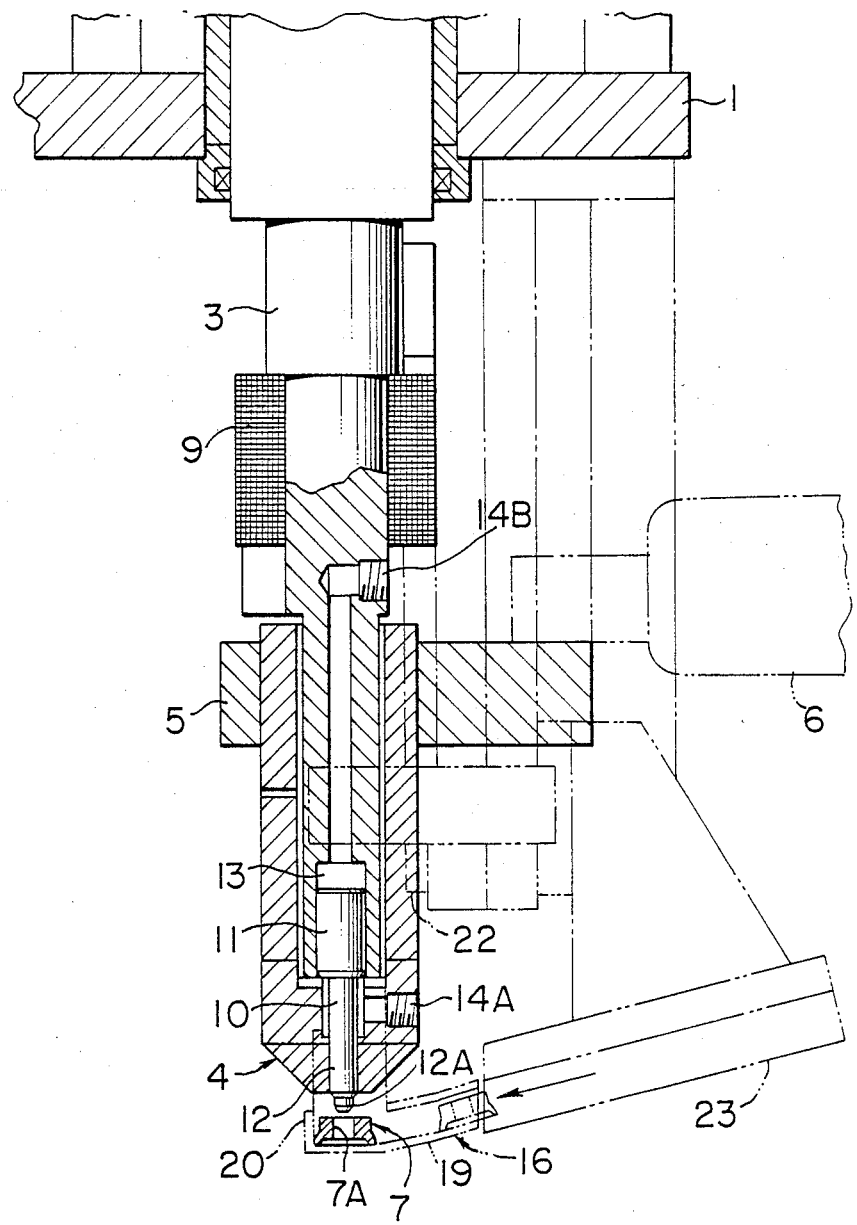
FIG. 1 is a sectional view of the upper electrode portion of the projection welder comprising one embodiment of the invention.
Figure 2:
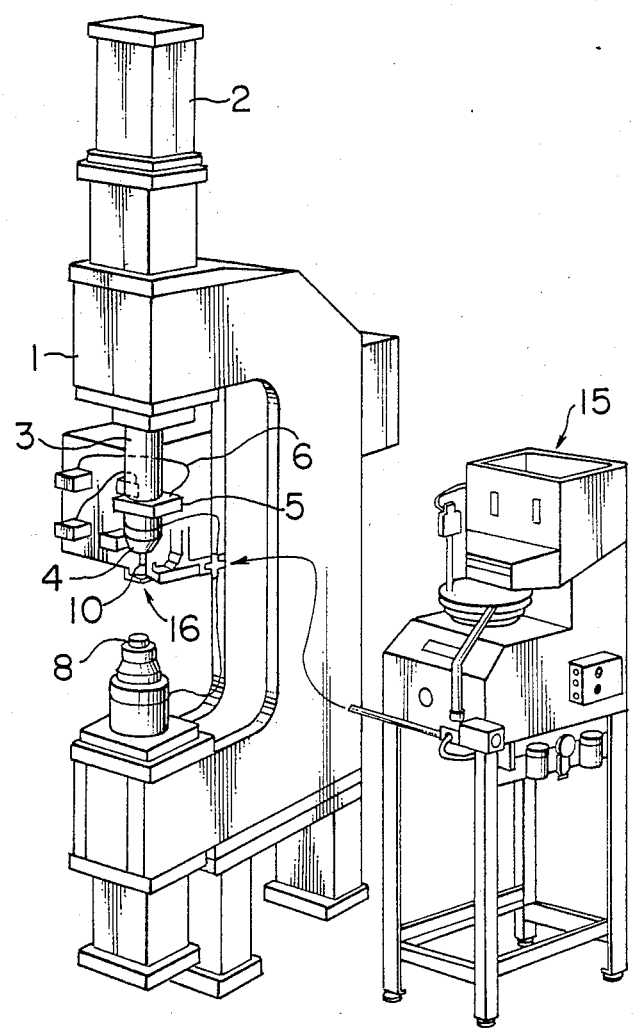
FIG. 2 is a perspective view of the whole of the projection welder shown in FIG. 1, together with a nut feeding apparatus located adjacent thereto.
Figure 3:
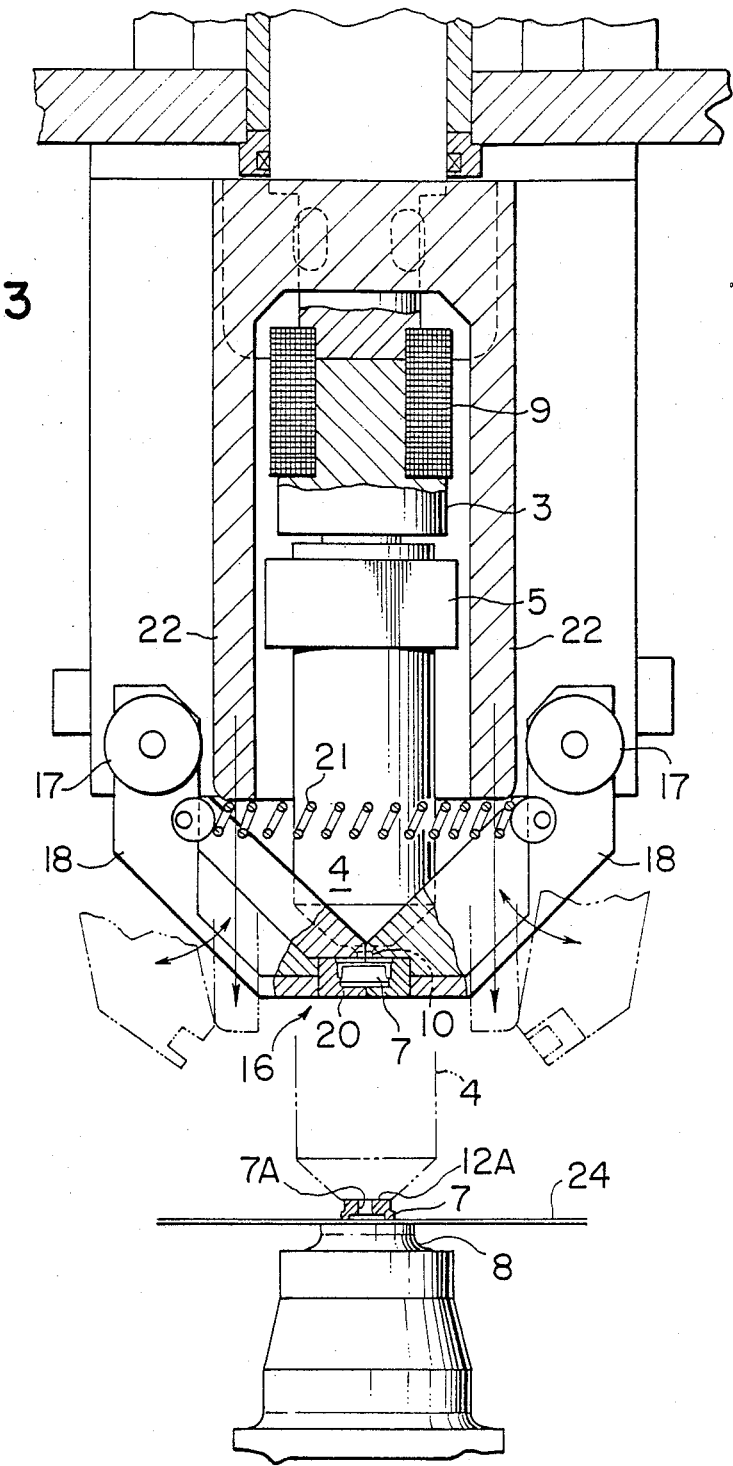
FIG. 3 is a side view of the projection welder shown in FIG. 1, showing a portion thereof including the upper and lower electrodes.

FIG. 1 is a sectional view of the upper electrode structure of the projection welding. FIG. 2 is a perspective view of the whole of the welder connected to a nut feeding apparatus. FIG. 3 is a side view of the welder showing the relation between the upper electrode with a nut catcher mechanism and the lower electrode. As shown, the welder is supported on a main body 1 (see FIG. 2) and comprises a supply head rod 3 moved perpendicularly downwardly by a pressure applying cylinder 2 mounted at an upper portion of the main body 1. Mounted at a lower portion of the supply head rod 3 in a manner to receive and enclose same is an upper electrode 4 which has a cable terminal 5 connected to an upper portion thereof. By connecting a welding cable 6 to the cable terminal 5, it is possible to pass a welding current to the upper electrode. A nut 7 to be welded is attracted and adheres to a forward end of the upper electrode 4, which is frustoconical in shape, to be moved to a lower electrode 8. The nut 7 is attracted to the upper electrode 4 as an electric current is passed to a coil 9 on the supply head rod 3 to energize same.

The supply head rod 3 and upper electrode 4 form a unit which constitutes a supply head main body in which a guide pin 10 is inserted through a forward end of the upper electrode 4 for movement into and out of the upper electrode 4. The guide pin 10 is composed of a piston section 11 and a pin rod section 12 smaller in diameter than the piston section 11, the piston section 11 being fitted in a cylinder chamber 13 formed in a forward end portion of the supply head rod 3 and the pin rod section 12 extending through the upper electrode 4 to stick out of the upper electrode 4 through its forward end. The cylinder chamber 13 in which the piston section 11 is movable in reciprocatory movement functions as a pneumatic cylinder and has air compartments on opposite sides of the piston section 11. Air inlet and outlet ports 14A and 14B are formed in the upper electrode 4 and supply head rod 3 to supply air to the upper and lower air compartments and discharge air therefrom. When it is pneumatically moved out of the upper electrode 4, the pin rod section 12 of the guide pin 10 is inserted in a threaded opening 7a of the nut 7 to be supplied, to effect centering of the nut 7 in the upper electrode 4. The pin rod section 12 is formed with a tapering surface portion 12A which is adapted to contact the edge of an entrance to the threaded opening 7A to enable the nut 7 to be positioned accurately with respect to the upper electrode 4.

As shown in FIG. 2, a nut feeding apparatus 15 located adjacent the main body 1 of the welder continuously feeds nuts to be welded to the forward end of the upper electrode 4. The main body 1 of the welder has a nut catcher mechanism 16 for guiding the nuts 7 supplied from the nut feeding apparatus 15 to the forward end of the upper electrode 4. More specifically, the nut catcher mechanism 16 comprises, as shown in FIG. 3, a plurality of catcher arms 18 each supported by a shaft 17 on either side of the upper electrode 4. The arms 18 have, as shown in FIG. 1, an inclined or straight nut feeding guide 19 and a nut receiving portion 20 formed at their forward end portions. More specifically, the arms 18 each have at the forward end portion thereof one-half portion of the guide 19 and one-half portion of the receiving portion 20 secured thereto as a unitary structure. The two arms 18 are moved to a closed position by the biasing force of a spring 21 to allow the nut 7 to be guided to the forward end of the upper electrode 4, so as to prevent the splaying movement of the arms 18 from interfering with the downward movement of the upper electrode 4. To enable the arms 18 to move pivotally to an open position, the supply head rod 3 is provided with a cam plate 22, as shown in FIG. 3, which moves downwardly to move the two arms 18 to an open position against the biasing force of the spring 21. A chute 23 of the nut feeding apparatus 15 is connected to the nut feeding guide 19 to provide a nut passageway.

The lower electrode 8 located opposite to the upper electrode 4 is secured to a lower portion of the main body 1 of the welder. A panel 24 for welding the nuts 7 thereto is adapted to be arranged on the lower electrode 8 as shown in FIG. 3.

Figure 4:
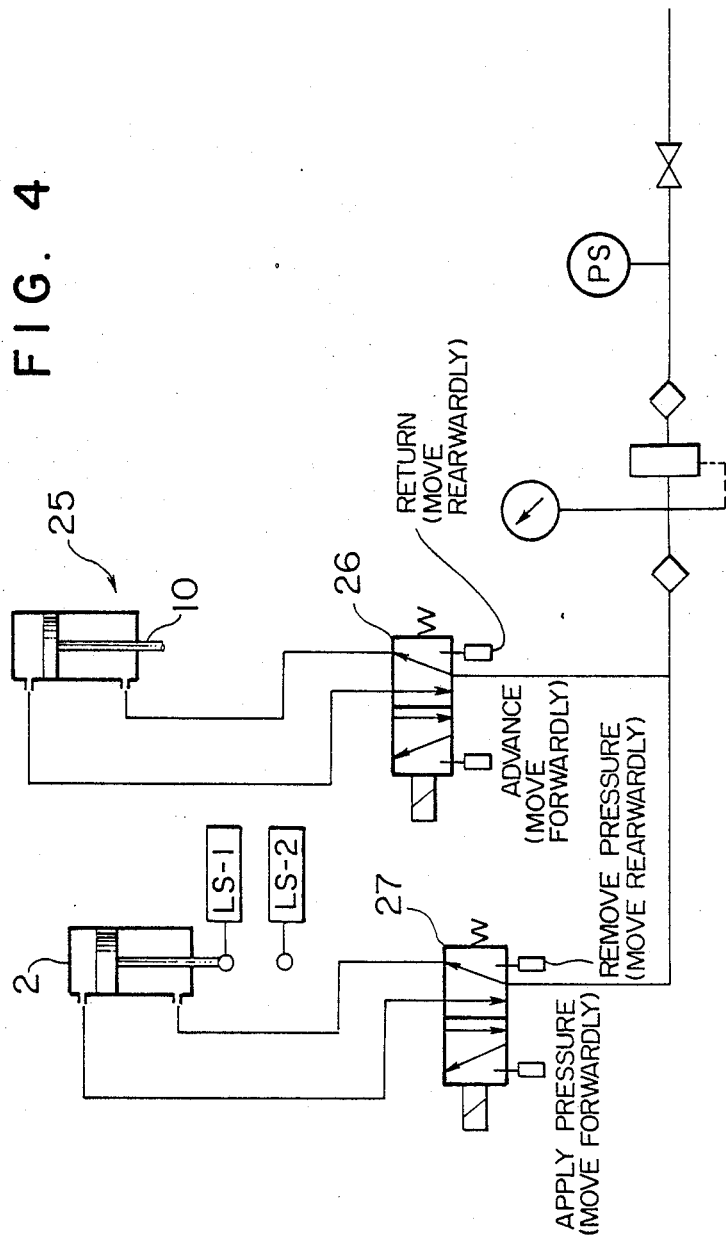
FIG. 4 is an air circuit diagram.
Figure 5:
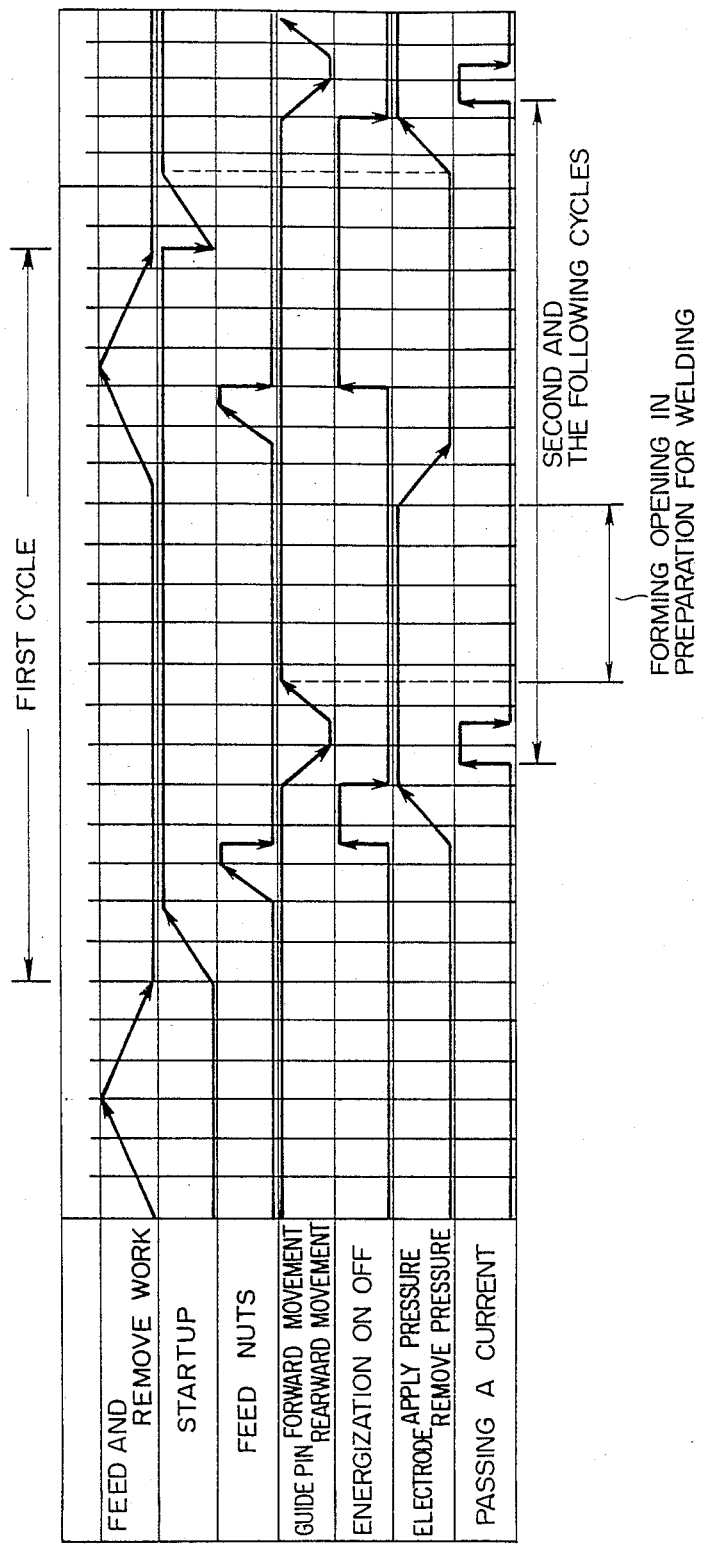
FIG. 5 shows a time chart.
Figure 6:
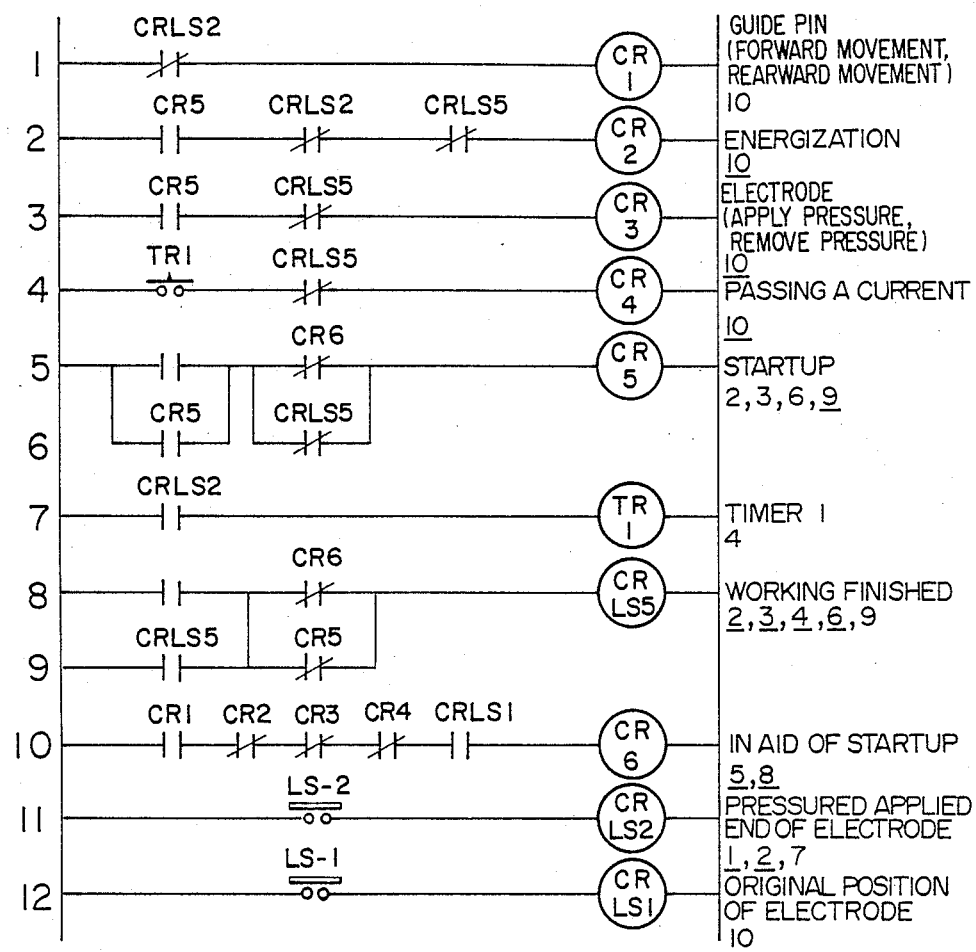
FIG. 6 is a sequence circuit diagram.

FIG. 4 shows a drive mechanism for moving the upper electrode 4 and the guide pin 10. The drive mechanism comprises an air circuit 25 for moving the guide pin 10 into and out of the upper electrode 4, and for applying pressure to the upper electrode (to move same forwardly) and releasing pressure therefrom (to move same rearwardly). The air circuit 25 actuates electromagnetic directional control valves 26 and 27 for moving the guide pin 10 and upper electrode 4. Various drives are actuated according to a time chart shown in FIG. 5 and controlled according to a sequence control circuit shown in FIG. 6. This control circuit operates such that the guide pin 10 is moved into and out of the upper electrode 4 when a welding current is passed to the upper electrode 4. More specifically, control is effected in such a manner that the guide pin 10 is withdrawn into the upper electrode 4 when welding is performed and made to stick out of the upper electrode 4 when the welding current passed to the upper electrode 4 is cut. This is achieved by supplying a change-over signal to the electromagnetic directional control valve 26 which is connected to the two air compartments disposed at the opposite ends of the cylinder chamber 13 in which the piston section 11 of the guide pin 10 moves in reciprocatory movement. More specifically, as the movement of the panel 24 on to the lower electrode 8 is sensed, a startup command is issued to start the feeding of the nuts 7 and an a contact $CR_5$ of a circuit for passing an electric current to the coil 9 is actuated, so that one of the nuts 7 is attracted and adheres to the upper electrode 4. When the nut 7 adheres to the upper electrode 4, the guide pin 10 is made to stick out of the upper electrode 4, so that the pin 10 is inserted in the threaded opening 7a and the nut 7 is correctly positioned with respect to the upper electrode 4 thanks to the tapering surface portion 12A. At the same time, an a˙ contact $CR_5$ of the drive circuit for moving the upper electrode 4 downwardly is actuated. This switches the electromagnetic directional control valve 27 to a pressure applying position to move the upper electrode 4, together with the nut 7 adhering thereto, toward the panel 24 placed on the lower electrode 8. Upon the upper electrode 4 reaching a predetermined position at the end of its downward movement, a limit switch LS-2 located in this position is turned on to cut the supply of the electric current to the coil 9. At the same time, a b contact of the circuit for actuating the electromagnetic directional control valve 26 to drive the guide pin 10 is actuated to switch the valve 27 to a position for withdrawing the guide pin 10 into the upper electrode 4, and a timer $TR_1$ is actuated to turn on a timer switch $TR_1$ to pass a welding current to the upper electrode 4 for a predetermined period of time to perform welding. Upon completion of welding, the welding current is cut and the electromagnetic directional valve 26 is switched to the original position to move the guide pin 10 out of the upper electrode 4.

In the projection welder of the aforesaid construction, the nut 7 adheres to the upper electrode 4 by magnetic attraction. When the latter is attracted to the former, the guide pin 10 is inserted in the threaded opening 7A formed in the nut 7, and the tapering surface portion 12A of the pin 10 is positioned against the edge of the entrance to the threaded opening 7A to effect centering of the pin 10. This enables the nut 7 to be correctly positioned with respect to the upper electrode 4 and hence with respect to the panel 24 placed on the lower electrode 8, by eliminating the need to follow process steps including forming openings for the nuts 7 in the panel 24 for positioning the panel 24 with the nuts 7. When the nut 7 is welded to the panel 24, the pin 10 is withdrawn and moved into the upper electrode 4 by the operation of the control means, thereby avoiding the risk that the welding current might shunt through the guide pin 10. This ensures that the welding current flows through only the projections, thereby providing welds of excellent quality.

In the embodiment shown and described here inabove, the guide pin 10 is arranged to be inserted into and out of the upper electrode 4. However, the invention is not limited to this arrangement of the guide pin 10 and the guide pin 10 may be arranged on the side of the lower electrode 8. The control circuit using a sequence circuit may be constituted by a microcomputer.

What is claimed is:
1. A projection welder, comprising:
a main body;
a pair of welding members connected to said main body, each of said members having a welding surface opposing each other;
at least one of said pair of members being movable relative to the other in opposite directions into and out of welding position, one of said pair of members having a central bore opening into the welding surface thereof, and the other of said pair of members being disposed to engage on the welding surface thereof a first metallic workpiece;
a guide pin, slidably mounted in said central bore, said guide pin being movable in said central bore in one direction for projecting out of said central bore beyond the welding surface of said one member without engaging the other welding member, and movable in a second direction opposite said one direction of withdrawing into the bore;

guide pin moving means, when operated to a first condition, moving said guide pin in said one direction, and when operated to a second condition, moving said guide pin in said second direction;

workpiece feeding means, when activated, for feeding a second workpiece having a central opening into engagement with the welding surface of said one member having the central bore;

welding member moving means, when operated to a first condition, moving at least one member for bringing said positioned second workpiece and said first workpiece into welding engagement with each other, and when operated to a second condition, moving said at least one member out of welding engagement;

welding current applying means, when operated to a first condition, for applying welding current to said first and second workpieces, and when operated to a second condition, for stopping the application of the welding current; and control means, including:
first circuit means for activating said workpiece feeding means at times when said guide pin moving means is operated to the first condition for positioning said second workpiece relative to the projected guide pin; and
second circuit means for operating said guide pin moving means to the second condition at times when said welding current means is operated to the first condition for avoiding shunting of the welding current through said guide pin.

2. A projection welder according to claim 1, wherein the means for feeding the second workpiece, comprises:
an electromagnetic coil mounted on said one of the pair of members having the central bore for magnetizing the welding surface thereof, said coil when activated for attracting the second workpiece into engagement with said welding surface, said guide pin being inserted in the central opening thereof.

3. A projection welder according to claim 2, wherein the second circuit means includes limit switch means responsive to the movement of said one of the pair of members to a predetermined position upon operation of said member moving means to the second condition for deactivating said electromagnetic coil and operating said guide pin moving means to the second condition for withdrawing the guide pin.

4. A projection welder according to claim 1, wherein the first circuit means includes means for operating the guide pin moving means to the second condition open operating of the welding member moving means to the first condition.

5. A projection welder according to claim 1, wherein the second circuit means includes means for operating the guide pin moving means to the first condition upon operation of the welding current means to the second condition.

6. A projection welder according to claim 1, wherein the second circuit means includes for activating the workpiece feeding means and operating the guide pin moving means to the first condition substantially simultaneously with the operation of the welding current means to the second condition.

7. A projection welder, comprising: a main body;
a pair of welding members connected to said main body, each of said members having a planar welding surface substantially parallel to and disposed one above the other in opposing relationship, at least one of said pair of members being an electrode member;

at least one of said pair of members being movable relative to the other in opposite direction into and out of welding position, said electrode member having a central bore opening into the welding surface thereof, and the other of said pair of members being disposed to support a substantially planar portion of a metallic workpiece;

means for feeding a nut having a central opening into welding position on the welding surface of said electrode member;

a guide pin, having a pin rod portion, slidably mounted in said central bore, said guide pin being movable in one direction in said central bore to one position for projecting said pin rod portion out of said central bore beyond the welding surface of said electrode member without engaging the welding surface of the other member, and movable in a direction opposite said one direction to a second position for withdrawing the pin rod portion into the bore of said one electrode member, said pin rod portion having a tapered surface portion at the end thereof for engaging an edge of the central opening of a nut being positioned on the welding surface of said electrode;

welding member moving means, when operated to a first position, for moving said at least one of the pair of welding members into welding position with the other said welding member, said guide pin being in said one position for centering a nut positioned on the welding surface;

welding current means, when operated to one condition to commence applying welding current to said electrode member having the central bore and said supported workpiece for welding the center nut to the planar portion of the workpiece and when operated to a second condition to cease applying welding current; and means operative to move said guide pin in said opposite direction to the second position, for withdrawing the pin-rod portion out of the central opening of the central nut and into the central bore at times when the welding member moving means is operated to a first position and prior to said welding current applying means being operated to the said one condition.

8. A projection welder according to claim 7, wherein the central bore of the electrode member includes a cylindrical portion having a diameter intermediate the outer ends of the central bore greater than the outer ends of the bore:
the guide pin includes a cylindrical piston portion at the end thereof opposite the pin-rod portion; and
wherein the guide pin moving means includes fluid pressure selectively applied to opposite ends of said piston portion for moving the guide pin in opposite directions to said first and second positions.

9. A projection welder according to claim 7 wherein the means for feeding the nut comprises:
a plurality of catcher arms pivotally mounted at one end to the electrode member and having a receiving portion at the opposite ends of the catcher arms;

spring means urging the catcher arms in proximity to each other for holding a nut adjacent the welding surface of the electrode member;

electromagnetic means for attaching the held nut to the welding surface of the electrode member with the pin rod engaging the central opening; and means including the electrode member for pivoting said catcher arms outwardly from adjacent the welding surface of the electrode member during movement of said electrode member to welding position.

* * * * *